Patented May 21, 1940

2,201,741

UNITED STATES PATENT OFFICE 2,201,741

POLYMERIC MATERIALS

John K. Owens, Buffalo, and Arthur G. Scroggie, Kenmore, N. Y., assignors to E. I. du Pont de Nemours & Company, Wilmington, Del., a corporation of Delaware No Drawing. Application October 3, 1938, Serial No. 233,118

9 Claims. (Cl. 18—48)

The invention herein described relates to synthetic linear polyamides and more particularly to a process for improving shaped articles derived from these polyamides.

The synthetic polyamides with which this invention is concerned are obtainable from bifunctional polyamide-forming reactants and are of two types; namely, those described in Patent 2,071,253 which are obtained from polymerizable amino acids or their amide-forming derivatives, and those described in Patent 2,071,250 and in Patent 2,130,948 which are obtained from diamines and dicarboxylic acids or amide-forming derivatives of dibasic carboxylic acids. In these polyamides the amide groups form an integral part of the main chain of atoms. These polyamides have been referred to as synthetic linear condensation polyamides, but obviously this term is intended to include polymers of the same composition or their equivalents even when produced by reactions which are not strictly chemical condensations. On hydrolysis with hydrochloric acid the polyamides revert to the reactants from which they are derived, the amino derivatives being obtained in the form of the hydrochloride. In the case of the diamine-dibasic carboxylic acid polyamides, there is obtained a diamine hydrochloride and a dibasic carboxylic acid.

As described in the above cases, the synthetic linear polyamides can be formed into useful filaments, films and the like which, on cold drawing or cold rolling, yield oriented products of even greater utility. The filaments, for instance, are permanently elongated 300% to 700% by application of stress below their melting point into fibers showing by X-ray examination molecular orientation along the fiber axis. The synthetic polyamides used in this invention are obtained when the polymerization reaction has been carried to the degree necessary to obtain the high molecular weight product, the filaments of which can be cold drawn into oriented fibers. The fiber-forming stage may be easily determined by touching the molten polyamide with a rod and moving the rod quickly away. If the fiber-forming stage is reached, a filament of considerable strength will be drawn from the molten polymer. At this stage the instrinsic viscosity is at least 0.4 as defined in the above-mentioned Patent 2,130,948.

The polyamide products are characterized by great strength, excellent elasticity, good dyeing characteristics, and insensitivity to most solvents and chemical reagents. On exposure to light and/or heat, however, the polyamides slowly discolor, taking on a dirty yellow appearance. This tendency toward discoloration is most marked in the case of the unoriented products.

An object of this invention is to improve the aging qualities of synthetic linear polyamides. Another object is to decrease the discoloration developed in fibers, films, etc. of synthetic linear polyamides on exposure to light or heat. A further object is to improve the durability of shaped articles prepared from synthetic linear polyamides. Other objects will appear hereinafter.

These objects are accomplished by treating the polyamide in the form of fine particles, filaments, films or the like, with a dilute solution of alkaline reagent for an extended period of time.

In the practice of this invention, the treatment of the polyamide is carried on for at least 15 minutes with a dilute solution of alkaline reagent having a concentration equal to that of a sodium hydroxide solution of from about 0.01% to 5% concentration. This treatment results in a marked reduction in the tendency of the polyamide to discolor on exposure to light or heat. The improvement is particularly noticeable in the case of unoriented polyamides. It is to be noticed that these effects, which have not heretofore been observed, cannot be obtained with alkali strong enough (at least 20% sodium hydroxide) to hydrolyze the polyamide to the diamine and dibasic acid, or with dilute solutions for a short time, as for instance, the time (a few minutes at the most) that the polyamide filament in wet spinning is in contact with an alkaline coagulating bath.

In the preferred method of carrying out the present invention, the polyamides in the form of yarn or fine particles are immersed in a dilute solution of caustic alkali, which has been freed from dissolved oxygen, at a temperature of 65° C. to 125° C., and preferably at the boiling temperature, for at least one hour although shorter times are somewhat effective. It will be understood, however, that substantially similar results could be achieved when the step of removing the dissolved oxygen is omitted. In the case of sodium hydroxide an 0.05% solution is very effective but a solution of up to 5% of sodium carbonate may be used with good results. After alkali treatment, the yarn is thoroughly washed to remove the alkali adhering to it and then dried. Acid may be added to the wash water to aid in removal of the alkali.

Yarn which has been subjected to the above treatment not only exhibits less tendency to darken on exposure to light or heat than untreated yarn, but it shows a smaller loss in tenacity on exposure to these conditions. The improvement is most marked when the yarn is subjected simultaneously to both heat and light.

The following examples, in which parts are by weight, illustrate the invention in greater detail:

*Example I*

One (1) part of delustered, unsized, undrawn yarn of 170/20 yarn count spun from polyhexamethylene adipamide was treated with 100 parts of 0.01 N sodium hydroxide for five hours at the boiling temperature, replacing the alkali solution with an equivalent amount of fresh 0.01 N sodium hydroxide solution at the end of each hourly interval. The yarn was washed with water until the washings were neutral to phenolphthalein and was then dried. For comparative purposes samples of the alkali treated yarn and unextracted polyhexamethylene adipamide yarn from the same source were subjected to hot air at 150° C. for five hours. At the end of this time the untreated yarn had turned yellow-brown, whereas the extracted yarn was still practically white. In addition, the control sample was extremely brittle and could no longer be drawn, whereas the extracted yarn was still strong and could be drawn at least 400%. By this treatment the oxygen absorption at 110° C. was diminished from about 1.5 g. per 100 g. sample of untreated yarn to less than 0.1 g. per 100 g. of treated yarn.

A stabilizing effect similar to that described in the above example was produced by treatment of polyhexamethylene adipamide yarn with a solution consisting of 0.2% olive oil soap and 0.2% sodium carbonate in water under the same conditions as above or by a solution wherein trisodium phosphate is substituted for the sodium carbonate.

*Example II*

Twenty-three (23) parts of finished, drawn yarn spun from polyhexamethylene adipamide were refluxed with 600 parts of 0.05% ammonium hydroxide for six hours at atmospheric pressure. This extraction process was repeated three times, replacing the ammonium hydroxide solution with fresh 0.05% ammonium hydroxide at the end of each hourly interval. The ammonium hydroxide was then washed out with distilled water and the yarn was dried and conditioned at 75° F. and 50% relative humidity. The following table illustrates the relative tenacity and elongation of a sample of polyamide yarn extracted by the above procedure in comparison with an unextracted control sample and natural silk, both before and after exposure for 65 hours to light from a carbon arc.

|  | Tenacity | | Elongation | |
| --- | --- | --- | --- | --- |
|  | Original grams/denier | Loss after 65 hours' exposure, percent | Original percent | Loss after 65 hours' exposure, percent |
| NH₄OH extracted sample | 4.91 | 4 | 23 | 16 |
| Unextracted control | 4.88 | 19 | 28 | 29 |
| Natural silk | 4.99 | 35 | 20 | 63 |

*Example III*

Twenty-five (25) parts of polyhexamethylene adipamide in the form of chips were micropulverized to pass an 0.027 inch sieve and boiled with 500 parts of 0.01 N sodium hydroxide for four hours, replacing the alkaline solution with an equivalent amount of fresh sodium hydroxide solution hourly. The extraction was completed by boiling the sample with 500 parts of fresh 0.01 N sodium hyrdoxide for six hours. The extracted polymer was washed free from alkali by boiling with distilled water for three hours, changing the water hourly, and was dried at 65° C. in a vacuum for 16 hours. Samples of ground polyhexamethylene adipamide subjected to alkali treatment by the above procedure and a control sample of unextracted ground polymer from the same source were spread in thin layers and exposed to hot air at 110° C. for 20 hours. The alkali-extracted sample was very much lighter in color than the unextracted control sample exposed for the same length of time. As an additional method of comparison, one part of the pulverized polyhexamethylene adipamide alkali-extrated by the above procedure and one part of untreated pulverized polymer, after exposure to hot air at 110° C. for 20 hours, were each dissolved in 10 parts of formic acid and compared in a colorimeter with a standard caramel solution of the type used in judging the color of nitrocellulose solutions. The solution containing the alkali-extracted polymer showed a color of 7 on the caramel scale in comparison with a color of 30 for the solution of the untreated polyamide.

*Example IV*

Twelve pieces, measuring 1" x 2" in size, of cloth made entirely of polyhexamethylene adipamide yarn of 50 denier were treated with boil-off solution which consisted of 0.2% olive oil soap and 0.2% sodium carbonate for two hours at the boiling temperature, replacing the boil-off solution with fresh solution at each half-hour interval. At the end of this treatment the pieces were rinsed with distilled water until the rinsings were neutral to phenolphthalein and were then dried. When subjected to an ironing treatment by a hot iron set for a temperature of 160°-210° C., through two complete heating and cooling cycles over a total length of time of about 15 minutes, the extracted samples showed considerably less discoloration than an untreated control. In place of the olive oil soap and sodium carbonate boil-off solution, 0.05% ammonium hydroxide may be used under similar conditions with an equally advantageous effect.

*Example V*

A 15-gram skein of drawn yarn spun from polyhexamethylene adipamide of 234/23 yarn count was treated at boiling temperatures for 24 hours with 500 cc. of 0.05% sodium hydroxide, replacing the alkali solution with fresh 0.05% sodium hydroxide at the end of each six-hour interval. After giving this yarn an additional boiling treatment for ½ hour with 500 cc. of boil-off solution consisting of 0.2% olive oil soap and 0.2% sodium carbonate, it was washed several times with distilled water to remove the alkali and conditioned at 75° F. and 50% relative humidity. After exposure for 100 hours to a carbon arc under conditions of fairly high temperature and high light intensity, the yarn was compared for tenacity and elongation with an unextracted control sample as indicated in the following table.

|  | Tenacity | | Elongation | |
| --- | --- | --- | --- | --- |
|  | Original grams/denier | Loss after 100 hours' exposure, percent | Original percent | Loss after 100 hours' exposure, percent |
| Alkali extracted yarn | 3.32 | 16 | 21 | 29 |
| Unextracted yarn | 4.06 | 58 | 35 | 77 |

As examples of additional synthetic linear polyamides which can be improved by alkali extraction may be mentioned polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylylene sebacamide, polyphenylene diacetamide, polyphenylene sebacamide, and the polyamide derived from 3,3'-diaminodipropyl ether and adipic acid.

Although polyamides obtainable from the reaction of diamines with dibasic carboxylic acids mentioned above are preferred, the polyamides obtainable from polymerizable amino acids, as for instance 6-aminocaproic acid, 9-aminononanoic acid and 11-aminoundecanoic acid, or amide-forming derivatives thereof (e. g. ε-caprolactam), may be used. The invention is also applicable to interpolyamides and to mixtures of different polyamides.

The term "synthetic linear polyamide" as used herein is not intended to be limited to polyamides derived solely from polyamide-forming reactants. It also includes polyamides derived from reaction mixtures containing, in addition to polyamide-forming reactants, other bifunctional polymer-forming reactants, e. g. glycols and hydroxy acids. For example, it includes polymers derived from the reaction of a diamine, a dibasic carboxylic acid, and a glycol. Although such products contain, in addition to amide groups, ester groups, the products retain many of the desirable properties of the pure polyamides. Such products can also be improved by the process of the present invention.

This invention is not limited to the treatment of particles, filaments, films and the like consisting solely of the fiber-forming polyamides. It is also applicable to products containing pigments, plasticizers, resins and other modifying agents. For example, a delustered polyamide yarn can be improved by alkali extraction in accordance with the process of this invention provided the alkali does not react with the delustering agent under the conditions used.

As further examples of alkalies which may be used in solution as extracting media for polyamides may be mentioned potassium hydroxide, lithium hydroxide, barium hydroxide, strontium hydroxide, calcium hydroxide, ammonium hydroxide, potassium carbonate, sodium carbonate, lithium carbonate, hydroxylated organic bases, such as quaternary ammonium hydroxides; alkali phosphates, alkali silicates, soaps, and alkali salts of the higher sulfonated fatty alcohols, such as lauryl and cetyl alcohol. It will be understood, of course, that suitable combinations of any of these materials may also be used. The alkali is preferably dissolved in water, although alcohol and aqueous alcohol can be used to dissolve the alkali. Preferably the alkali should not be used in concentrations exceeding 5%. The time of treatment will depend upon the temperature used and to some extent upon the degree to which the polyamide is subdivided. Obviously, fine filaments can be extracted more rapidly than bristles.

Yarns or other polyamide products can be treated with the alkali either in the unoriented or oriented condition. The unoriented product can be subsequently cold drawn or cold rolled, if desired.

Although polyamides treated according to the process of this invention show a diminished tendency to discolor on exposure to heat and light, this process is not effective for removing the color which has already formed in polyamides due to exposure to heat or light.

While it is generally most convenient to immerse the polyamide in the alkaline solution, it will be obvious that the polyamide product can be sprayed with the alkaline reagent.

This invention provides a convenient method for improving the properties of polyamides, particularly in the form of sheets, yarns and fabrics. The increase in resistance to yellowing and deterioration produced by this invention is particularly important in connection with polyamide yarns and fabrics which are to be used in the undyed form or which are to be dyed in light shades. The improvement in durability, i. e. tenacity, resulting from the process of this invention is most important in connection with fabrics which are to be used out of doors or which are to be subjected to elevated temperatures.

As many apparently widely different embodiments of this invention may be made without departing from the spirit and scope thereof, it is to be understood that we do not limit ourselves to the specific embodiments thereof except as defined in the appended claims.

We claim:

1. A process for improving the resistance of synthetic linear polyamides towards discoloration on exposure to light or heat which comprises treating said polyamides with a solution of alkaline reagent having a concentration equivalent to that of sodium hydroxide solution of from about 0.01 per cent to 5 per cent concentration.

2. A process which comprises treating a synthetic linear polyamide for a period not less than 15 minutes, and less than the time that will cause destructive hydrolysis of the polyamide, with a solution of alkaline reagent having a concentration equivalent to that of a sodium hydroxide solution of from about 0.01% to 5% concentration and at a temperature of from about 65° C. to 125° C.

3. A process for decreasing the tendency of articles formed from synthetic linear polyamides to discolor upon exposure to light and heat which comprises treating said polyamides in the form of fine particles, filaments, films and the like for a period of at least 15 minutes to 30 hours with a solution of alkaline reagent having a concentration equivalent to that of a sodium hydroxide solution of from about 0.01% to 5% concentration and at a temperature of from about 65° C. to 125° C.

4. The process set forth in claim 3 in which said alkaline reagent is caustic alkali.

5. The process set forth in claim 3 in which said alkaline reagent is caustic alkali at its boiling point.

6. The process set forth in claim 2 in which said polyamide is obtainable by condensation polymerization from a diamine and a dicarboxylic acid.

7. The process set forth in claim 2 in which said polyamide is hexamethylene adipamide.

8. The process set forth in claim 2 in which said polyamide is obtainable from a polymerizable amino acid.

9. The process set forth in claim 1 wherein said polyamide is in the form of fine particles, filaments, films, and the like.

JOHN K. OWENS.
ARTHUR G. SCROGGIE.